United States Patent Office 3,076,353
Patented Feb. 5, 1963

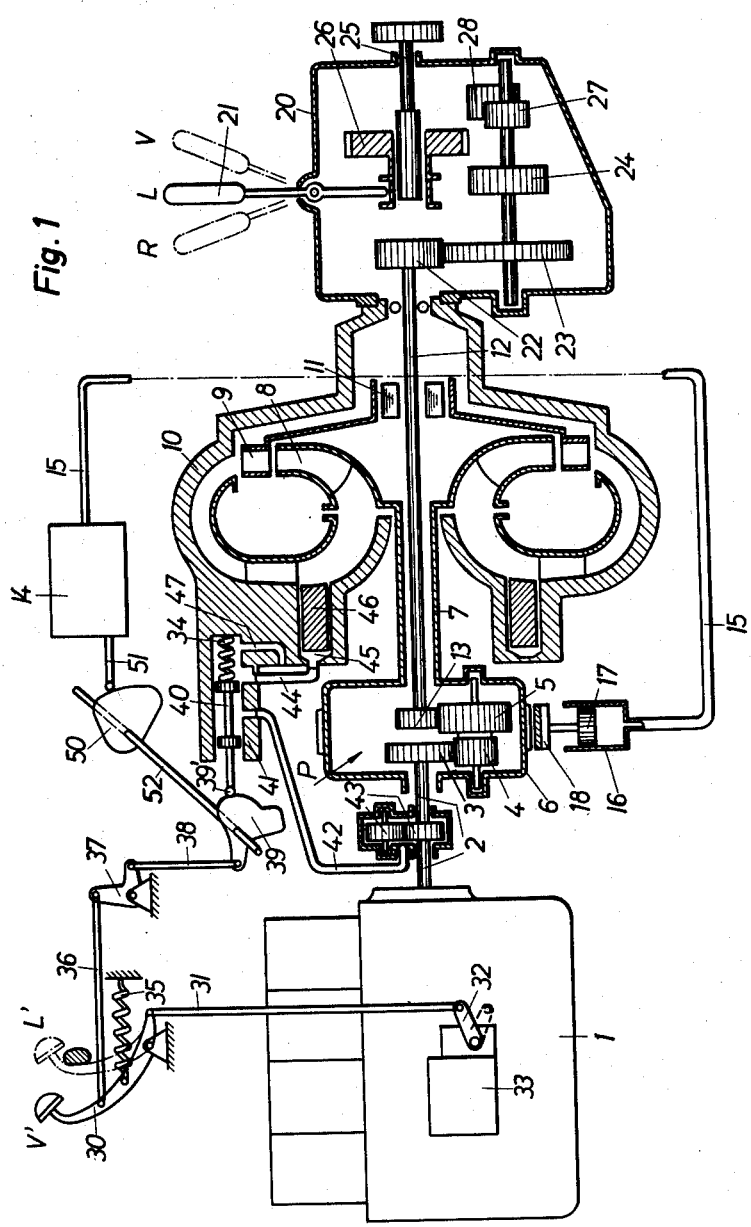

3,076,353
DRIVE WITH VARIABLE PRIME MOVER AND FLUID TRANSMISSION WITH CONTINUOUSLY FILLED FLUID CIRCUIT
Wilhelm Gsching, Heidenheim (Brenz), Germany, assignor to J. M. Voith G.m.b.H., Maschinenfabrik, Heidenheim (Brenz), Germany
Filed Oct. 1, 1959, Ser. No. 843,880
Claims priority, application Germany Oct. 4, 1958
11 Claims. (Cl. 74—645)

The present invention relates to a drive with a variable prime mover or drive motor, preferably an internal combustion engine, and with a subsequent transmission at least the lowermost working range of which operates with a continuously filled fluid circuit such as a torque converter or fluid coupling. While not limited to, the invention is considered particularly advantageous for motor vehicles.

With drives of the above mentioned type with continuously filled torque converter it is, as a rule, customary to provide no clutch between the engine and the torque converter. This is possible inasmuch as with a torque converter, even though the latter absorbs power also at a standstill of the output shaft, the power input is dependent on the third power of its input speed in conformity with the formula $N = C \times n^3$. In this formula N represents the power absorbed by the torque converter, C represents an approximately constant value dependent on the respective torque converter type, and $n$ represents the input speed of the torque converter. Consequently, the power absorbed by the torque converter during the idling period of the drive motor or prime mover is rather low. However, it is nevertheless for practical operation still too high, particularly with motors which have a high idling speed with regard to their full speed. Other undesired inherent consequences are, among others, a so-called crawling effect of the drive during the idling of the engine, as well as a noticeably increased fuel consumption during the idling period. Similar drawbacks are also encountered in connection with drive systems which comprise a fluid coupling which is for the lower working range continuously filled and continuously connected to the motor.

It is, therefore, an object of the present invention to provide a drive system of the general type set forth above, which will overcome the above mentioned drawbacks.

It is another object of this invention to provide a drive system with variable drive motor and a transmission comprising at least one continuously filled fluid circuit, which will considerably reduce the idling power and thereby also the fuel consumption of the motor during idling.

It is another object of this invention to provide a drive system of the above mentioned type, which will make it possible to reduce the idling speed while avoiding idling noises and oscillations of the motor brought about by an unsteady operation of the motor.

It is still another object of this invntion to provide a drive system of the type set forth in the preceding paragraphs, which will considerably facilitate the engagement and disengagement of gears or other positive gear change elements arranged subsequently to the fluid circuit.

These and other objects and advantages of the invention will appear more clearly from the following specification in connection with the accompanying drawings, in which:

FIG. 1 diagrammatically illustrates a drive system according to the present invention with variable diesel engine, a differential torque converter transmission, and a mechanical change gear transmission arranged subsequently to said differential torque converter transmission.

Figure 4:
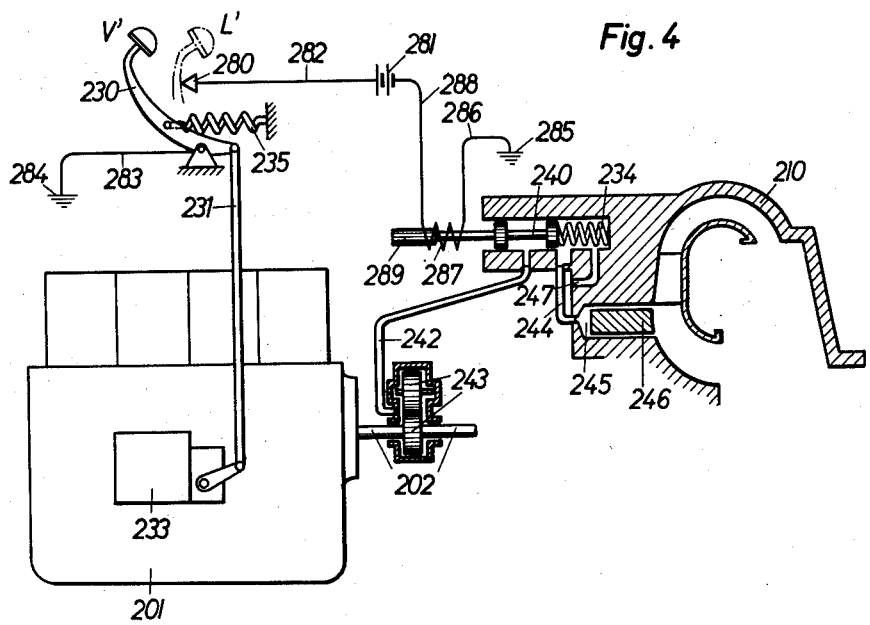

FIG. 4 diagrammatically illustrates a control device for the fluid, which is somewhat modified over that of FIG. 1.

Figure 5:
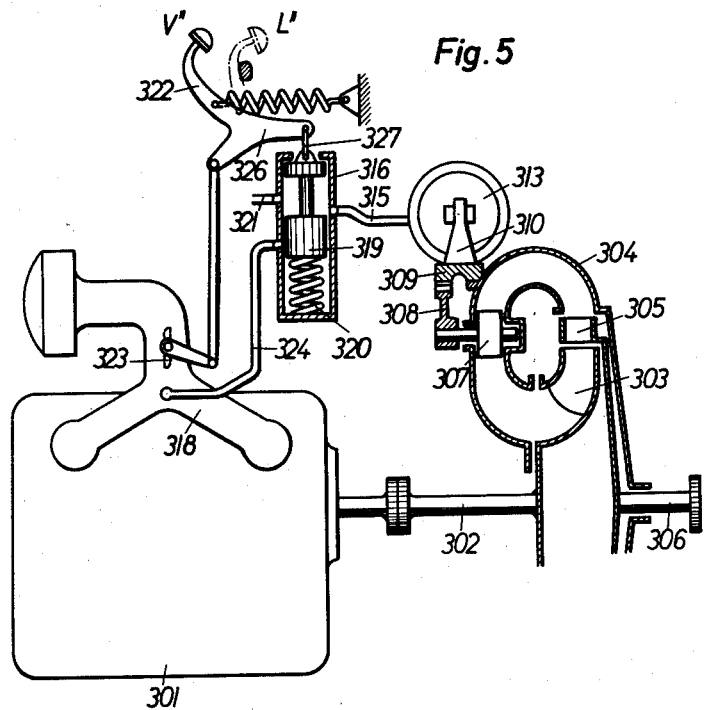

FIG. 5 represents a diagrammatic illustration of a further modified drive system according to the invention with a torgue converter having adjustable guide vanes.

Figure 6:
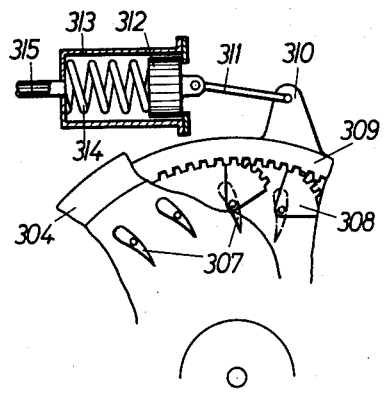
Figure 7:
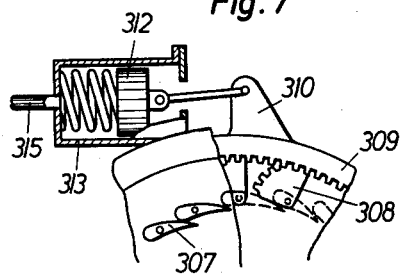

FIGS. 6 and 7 illustrate some details for use in connection with the arrangement of FIG. 5.

General Arrangement

The drive system according to the present invention which includes a fluid circuit which is effective within the lower working range and is continuously filled, comprises an automatic control device known per se for interrupting the flow of power. Said control device comprises adjustable elements adapted to be effective in the flow of the fluid circuit. These elements may be designed as adjustable guide vanes, displaceable vane rings, or similar known control elements, preferably as cylindrical annular slides adapted to be moved axially into the flow of the fluid circuit. According to the present invention, the operation of this control device of the fluid circuit is dependent on the fuel feed adjustment of the motor. The arrangement is such that with a fuel feed adjustment corresponding to the idling of the motor, the control device is always in its disengaging position, i.e. in a position in which it interrupts the power flow, whereas with all increased fuel feed adjustments, said control device is in its engaging position.

The automatic control of the control device for the fluid circuit is effected in a most simple manner by an automatic connection between said control device and the adjusting elements for the fuel feed, as for instance the accelerator of the engine, the power control lever of the latter, or the like. This connection may be effected by mechanical means, such as a link system and levers, or by electrical means, hydraulic means, pneumatic means, or other power conveying elements. In some instances, also a modification is advantageous according to which the control device for the fluid circuit is operatively connected with adjusting means controlled by the subatmospheric pressure in the suction pipe of the engine. Thus, for instance, such adjusting means may consist of a piston or a pressure operable diaphragm exposed to said subatmospheric pressure.

For the sake of completeness, it may be mentioned that fluid transmissions have been suggested in which an annular slide is adapted automatically to be moved into the working chamber of a fluid circuit. With these heretofore known arrangements, however, the control is effected in contrast to the present invention, in conformity with the speed of the prime mover or drive motor in such a way that the annular slide or valve member interrupts the flow always below a certain speed. This has the drawback that for instance when driving a vehicle down hill and with the accelerator in idling position, in which instance due to the pushing action of the vehicle the engine speed is higher than the idling speed, the annular slide or valve member will occupy its opening position which will result in an increased idling fuel consumption of the engine. In contrast thereto, with the drive according to the invention, the annular slide or valve member will also under the just described working conditions occupy its position of interrupting the flow.

With another heretofore known drive, a fluid flow circuit is provided which will automatically empty when the accelerator occupies its idling position. This arrangement has likewise proved unsatisfactory, because the filling and emptying process takes too long, sometimes up to half a minute, which is not tolerable, above all with drives for motor vehicles when starting. Furthermore, with such an arrangement it is necessary to provide a container for storing the entire quantity of working fluid released from the fluid circuit. The provision of such additional container causes considerable difficulties in connection with various drives, especially those intended for motor vehicles where the available space is rather limited.

*Structural Arrangement*

Figure 1A:
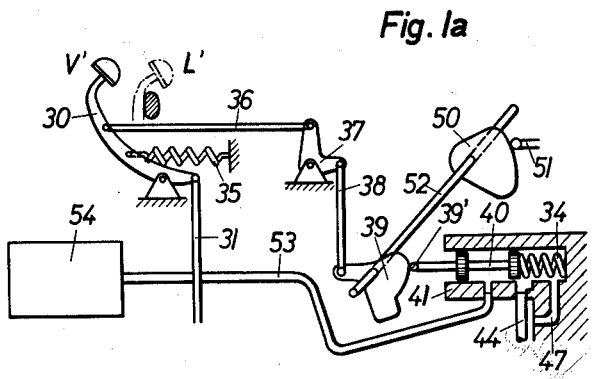
FIG. 1a shows a slight modification over FIG. 1 with regard to the supply of control pressure.
Figure 2:
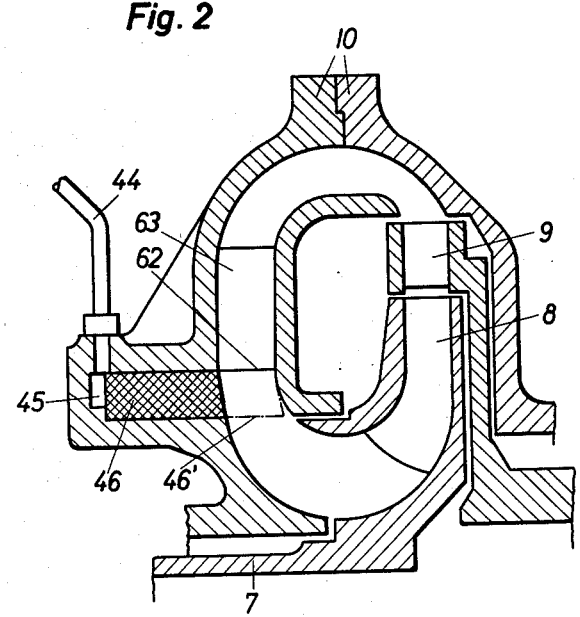
FIG. 2 illustrates on a scale somewhat larger than that of FIG. 1 a partial section through a torque converter of FIG. 1 with details of an annular valve member axially insertable into the fluid circuit.

Referring now to the drawings in detail and FIGS. 1 and 2 thereof in particular, the drive system described therein comprises a diesel engine 1 which, through the intervention of a shaft 2, is adapted to drive a sun wheel 3 of a two-plane power dividing planetary gear transmission generally designated P. A portion of the power input to said planetary gear transmission P is conveyed to shaft 12 through the rigidly interconnected planetary gears 4 and 5, the planetary gear carrier 6, and hollow shaft 7 as well as through pump wheel 8, turbine wheel 9 of the continuously filled torque converter 10 and through free wheel drive 11. This represents the hydraulic power branch of the differential torque transmission. A second purely mechanical power branch comprises the sun wheel 13 and shaft 12.

In the lower working range, the two power branches of the differential torque converter transmission are engaged, and the torque converter 10 conveys a portion of the motor output—hydromechanical operation with power division—. For purposes of obtaining a further upper working range, an automatic control governor 14 is provided which feeds a pressure fluid through conduit 15 to a cylinder 16 having reciprocably mounted therein a piston 17 adapted to be acted upon by the pressure fluid conveyed through conduit 15 to cylinder 16 to engage brake 18 with the planetary gear carrier 6. If this is effected, the hollow shaft 7, pump wheel 8 and turbine wheel 9 will be at a standstill. In this connection, it should be noted that the turbine wheel 9 is adapted due to the free wheel drive 11 to disconnect itself from the forwardly turning transmission shaft 12, so that the hydraulic power path is made ineffective and the transmission of power is then effected only purely mechanically through the above indicated mechanical power path.

The differential torque converter transmission 3—18 is followed by a reversible change gear transmission 20 which is adapted positively to be made effective. When the shift lever 21 occupies the position V, the forward velocity range is engaged. In this instance, the power flow is effected through gears 22, 23, 24 and gear 26 which is rotatably but axially adjustably connected to output shaft 25.

When the shift lever 21 occupies the position R corresponding to the rear speed, the gears 22, 23, 27 and an intermediate gear 28 for reversing the direction of rotation, as well as gear 26 will be effective. When shift lever 21 occupies the idling position L, the drive is interrupted. Shaft 25 may be drivingly connected to the driving wheels of a street vehicle.

It is, of course, to be understood that the change gear transmission may also be of a different design and that instead of the described change gear transmission an automatically shiftable, stepwise shiftable transmission, or a transmission of the last mentioned type and change gear transmission may be employed.

The control of the diesel engine 1 is effected in customary manner by adjusting an accelerator 30 whereby through the intervention of a bar 31 and a lever 32 the quantity of fuel conveyed by a fuel injection pump 33 to the motor will be varied accordingly. A retraction spring 35 continuously urges the accelerator 30 to move to and stay in the position L' which corresponds to the idling operation of the motor. When the accelerator 30 occupies the position V', the motor receives its full charge.

In conformity with the present invention, the accelerator 30 is, by means of a rod 36, a bell crank lever 37, a rod 38, a control cam 39 and a roller 39', connected to an axially displaceable control piston or valve spool 40 of a control cylinder 41. A pressure spring 34 brings about that the roller 39' connected to an extension of spool 40 will always be pressed against control cam 39. Control cylinder 41 communicates with a pressure fluid supply conduit 42 and furthermore communicates through a second conduit 44 with the left side of a cylindrical chamber 45 of torque converter 10. Conduit 42 may be connected for instance to a gear pump 43 driven by the engine 1, and said pump may also serve for maintaining the torque converter filled and for furnishing the lubricating oil.

A cylindrical annular piston 46 is reciprocably mounted in said cylindrical chamber 45 and is adapted by pressure fluid conveyed to piston 46 through conduit 44 to be displaced axially into the path of fluid flow of the converter 10 whereby the fluid circulation is interrupted. It is, of course, to be understood that in this connection the pressure fluid must have a pressure in excess of the elevated pressure in the torque converter. The annular piston 46 simultaneously serves as an annular valve for the torque converter. If, however, spool or piston 40 occupies its left-hand position as shown in FIG. 1, the left portion of the annular chamber 45 will not any longer through conduit 44 communicate with the pressure conduit 42 of pump 43 but will through opening 47 communicate with the atmosphere. In this instance, the annular valve member or piston 46 will, due to the increased pressure prevailing in the interior of the torque converter, be moved to its left-hand end position shown in the drawing in which the fluid path of the torque converter is not interrupted but is completely free.

The control cam 39, the connecting linkage 36—38 pertaining thereto, control piston 40, and the control openings of the control cylinder 41 are, in conformity with the present invention, so designed that when accelerator 30 occupies its idling position L', the annular piston or valve member 46 will have its left end face acted upon by pressure fluid so that said piston will be moved into its right-hand end position in which it interrupts the flow path of the torque converter thereby reducing the power transmitting ability of the latter to a very slight fraction of its normal magnitude. With all other accelerator positions which correspond to the partial or full load operation of the engine 1, control piston 40 will interrupt the supply of pressure fluid to annular piston 46 so that the latter will then stay in its left-hand end position and the flow of fluid in the torque converter will be possible without any impediment.

Thus, as soon as accelerator 30 is returned to its idling position L', either when the vehicle is at a standstill or during operation or when shifting the change gear transmission 20—the torque absorbed by the torque converter will be reduced to a very minor fraction of its normal magnitude by the then engaged annular piston 46. As a result thereof, the fuel consumption of the engine during the idling of the latter will be kept extremely low, and furthermore, the idling torque—drag torque—exerted upon shaft 12 will be reduced to a minimum. Furthermore, this very low drag torque is advantageous for the shifting of the change gear transmission 20 because the change gear 26 will then be shiftable without any difficulties while the intended meshing of tooth and tooth space will be facilitated.

If, however, the annular slide or piston 46 together with the control according to the invention were not provided, the torque converter would absorb a considerable power in the lowermost working range and during the idling of the motor. Such power absorption would naturally result in an increased fuel consumption during the idling operation and in a higher drag torque at the output shaft and also would make the shifting of the change gear transmission more difficult.

As mentioned above, the control governor 14 brings about an automatic shifting of the differential torque converter transmission from a lower working range to an upper purely mechanical working range and does so in conformity with the driving speed and the position of the accelerator 30. In connection therewith, for purposes of simplifying the design, it is advantageous to arrange cam disc 50, which conveys the movement of accelerator 30 in a certain manner through pin 51 to control governor 14, on the same adjusting shaft 52 as cam disc 39 which latter serves for controlling the annular piston 46. The control of control governor 14 in conformity with the driving speed and the design of such control governor are well known and therefore are not illustrated herein.

Instead of connecting the pressure fluid conduit 42 with the gear pump 43, it would also be possible in conformity with FIG. 1a to replace the conduit 42 of FIG. 1 by a conduit 53 and to connect the latter with another pressure fluid source, for instance with a compressed air containing container 54 which in most instances is present anyhow with an arrangement of the type involved. All other parts illustrated in FIG. 1a correspond to those of FIG. 1 and have been designated with the same reference numerals as in FIG. 1.

FIG. 2 illustrates on a somewhat larger scale than FIG. 1 certain details of the torque converter of FIG. 1 and in particular the annular slide or piston 46. The position in which the annular piston interrupts the flow of fluid in the torque converter is illustrated in FIG. 2 in dot-dash lines. This position is designated with the numeral 46'. Advantageously, the edges 62 which in this instance are the exit edges of the guide vanes 63 of the torque converter are evenly spaced from the axis of rotation throughout their entire extension. Furthermore, the annular piston 46 is arranged directly adjacent said guide vane edges 62 in such a way that said edges 62 will form an additional guide for the annular piston. Such an arrangement will eliminate the danger of an edging or canting of the annular piston.

Figure 3:
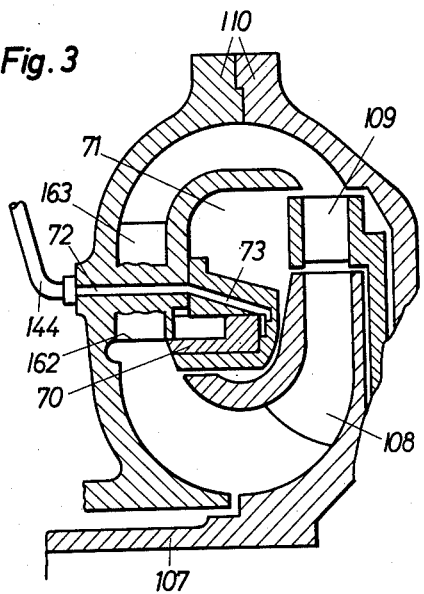
FIG. 3 is a section somewhat similar to FIG. 2 through a modified torque converter with axially displaceable annular valve member.

FIG. 3 shows another more compact design of the torque converter according to which the axially displaceable annular piston or valve slide 70 is mounted within the so-called core ring chamber 71 of the torque converter. Also this annular piston 70 will during its movement for purposes of a better guiding, slide directly along the exit edges 162 of the guide vanes 163. One or more of the guide vanes 163 are provided with bores 72 which in cooperation with a conduit 144 and bore 73 serve for conveying fluid for adjusting the annular piston 70. The elements designated with the numerals 107, 108, 109, 110, 144, 162 and 163 correspond as far as their function is concerned to the elements 7, 8, 9, 10, 44, 62 and 63 of FIGS. 1 and 2. In contradistinction to FIGS. 1 to 3 the actuation of the annular piston may also be effected in a known manner by means of a mechanical device, for instance by means of bevel gears, levels and rods, as shown in U.S. Patent 1,859,448.

FIG. 4 illustrates an arrangement according to which the control for actuating the annular piston in the torque converter differs somewhat from the design of FIG. 1. The reference numerals 201 and 247 in FIG. 4 designate elements similar to the elements 1 and 47 in FIG. 1. The accelerator 230 controlling the fuel supply to the drive motor 201 will in this embodiment, when occupying its idling position L', engage an electric contact 280 and will thereby close an electric circuit. This electric circuit comprises an electric source 281, a conduit 282, a contact 280, an accelerator 230, a conduit 283, the two terminals 284 and 285, the conduit 286, the magnetic coil 287 and conduit 288. The magnetic field produced by the magnetic coil 287 attracts the iron core 289 so as to cause the latter to move into the coil which, with regard to FIG. 4, means toward the right so that the valve slide 240 will occupy its right-hand position not shown in the drawing in which the passage from pressure fluid delivery pump 243 to annular piston 246 will be open. Annular piston 246 will then be moved toward the right and interrupt the respective flow in torque converter 210.

When the accelerator occupies the position V' in FIG. 4, and also in any partial load positions of accelerator 230, the said electric circuit will be interrupted. In these conditions of operation, the pressure spring 234 moves valve spool 240 into the left-hand end position shown in the drawing in which the annular chamber 245 at the annular piston 246 communicates with the atmosphere through conduit 247. The elevated pressure prevailing in the interior of the torque converter then presses the annular piston 246 to its left-hand end position in which the working chamber of the torque converter is completely free as is required for an undisturbed power transmission from the motor to the output shaft. The parts illustrated in FIG. 4 and pertaining to the transmission are designed in conformity with the corresponding parts of FIG. 1.

FIGS. 5 to 7 illustrate a further embodiment of the drive according to the invention with a carburator engine 301 adapted to drive a pump wheel 303 of a torque converter 304 through a shaft 302. The turbine wheel 305 of said converter 304 conveys the power to the output shaft 306 and furthermore to a stepwise shiftable change gear transmission which is adapted to be shifted in a positive manner as, for instance, as is shown in FIG. 2 of U.S. Patent 2,354,596. The torque converter is in this connection equipped with adjustable guide vanes 307 which by means of two segments 308 and a gear ring 309 may be adjusted to their full opening position or to their closing position according to FIG. 7 in which instance the fluid circulation is completely interrupted.

Gear ring 309 is provided with an extension 310 which latter is connected through a rod 311 with a piston 312 displaceably mounted in a cylinder 313. The pressure chamber formed by cylinder 313 and piston 312 communicates through a conduit 315 with a control cylinder 316. Cylinder 316 communicates through a conduit 317 with the suction pipe 318 of the drive motor. Control cylinder 316 has movably arranged therein a control piston 319 which is adapted by means of a pressure spring 320 to be moved into its uppermost end position shown in FIG. 5 in which it releases the passage between conduit 315 and a conduit 321 leading into the atmosphere. This uppermost position is occupied by control piston 319 whenever the carburator engine 301 is adjusted for full or partial load which means when the accelerator 322 occupies its position V'' or a position between V'' and L'' inasmuch as then in the motor suction pipe 318 and thus also in the lower part of cylinder 316 the lowest subatmospheric pressure will prevail which cannot or can only slightly compress the pressure spring 320. Inasmuch as in this condition of operation, in cylinder 313 the full outer air pressure will prevail, the pressure spring 314 moves piston 312 to the right-hand end position thereof in which the guide vanes 307 fully release the fluid chamber of the torque converter. The guide vanes then occupy the position shown in FIG. 6.

During idling operation of the engine, i.e. when the accelerator 322 occupies the position L'', the throttle 323 in the motor suction pipe 318 is almost completely closed and the maximum atmospheric pressure will then prevail in said pipe 318. As a result thereof, the control piston 319 is displaced against the thrust of spring 320 so as to occupy its lowermost end position in which the connection between conduit 321 and conduit 315 is interrupted and instead the passage between conduit 317, 324 and 315 is released. The subatmospheric pressure of the motor suction pipe 318 will then pass into cylinder 313 and displace piston 312 against the thrust of pressure spring 314 so as to move piston 312 to its left-hand end position in which the guide vanes 307 interrupt the fluid flow in the torque converter. This position is shown in FIG. 7.

For purposes of adjusting piston 312, it is also possible instead of employing the subatmospheric pressure in suction pipe 318, to make use of a pressure fluid, such as for instance compressed air. In this instance, conduit 324 is not any longer in conformity with FIG. 4 connected to conduit 317 but instead is connected to the pipe system conveying compressed air. Furthermore, in such an instance, the cylinder 313, spring 314, and the transmission elements 308 to 311 have to be changed accordingly.

Also instead of the gear ring 309 and the gear segment 308 other transmission elements may be employed as for instance such with link systems similar to those used in the water turbine construction, or link systems with screw elements may be employed.

It is further to be noted that instead of the torque converter 304 it is also possible to provide a fluid coupling. Inasmuch as such fluid coupling has no guide vanes, piston 312 has to act upon a different element of the coupling, for instance upon an annular slide according to FIGS. 2 or 3. The design of the coupling itself may be effected in conformity with FIGS. 1 or 3 to 5 of German Patent No. 621,413.

As will be evident from the preceding description, the arrangement according to the present invention has over heretofore known drive systems of the type involved the advantage that due to the fact that during the idling of the motor the fluid circulation in the converter is automatically interrupted, the idling power and thus also the fuel consumption of the drive motor during idling will be considerably reduced. This is also the case when the lower velocity range is engaged or the vehicle is at a standstill or in rolling condition. Thus, for instance, it is possible in conformity with the present invention, with a continuously filled converter to reduce the idling power from a tenth to a twentieth of the magnitude which is required when the torque converter is not interrupted. This advantage is of particular importance with drives for vehicles which have to stop and start frequently, such as city buses. This advantage also applies to drives with relatively high idling speed of the driving motor.

A further advantage of the present invention consists in the possibility to reduce the idling speed without encountering an unsteady running of the engine. The low idling speed will result in a further reduction in the fuel consumption during idling. If, however, the fluid circuit of the lowermost velocity range is not provided with an arrangement according to the invention, the idling speed of the engine has to be selected higher since otherwise the engine would due to the load caused by the higher idling power run in an unsteady manner.

Furthermore, due to the reduction of the so-called drag torque, the engaging and disengaging of the gears following the fluid circuit or other similar positive shifting elements as for instance jaw clutches, will be greatly facilitated or sometimes be made possible only by the reduction of said torque. The slight drag torque which will still be present with an arrangement according to the invention is desirable since it will prevent the shifting of gear tooth upon gear tooth. Therefore, the arrangement of the present invention is also advisable when the fluid circuit is followed by a positively shiftable transmission of the stepwise shiftable type or of a reversible change gear transmission.

It will be understood that where "manually operable" is referred to, this means operable by other than power means, such as by the hand or the foot.

It is, of course, to be understood that the present invention is, by no means, limited to the particular constructions shown in the drawings but also comprises any modifications within the scope of the appended claims.

What I claim is:

1. In a drive system, especially for motor vehicles equipped with an internal combustion engine: a speed variable fuel operable driving engine, a transmission drivingly connected to said driving engine and comprising a fluid flow device having at least one working range in which it operates with a continuously filled fluid circuit, fluid flow control means comprising adjustable means adjustably arranged within the fluid circuit of said fluid flow device and movable into a closing position to impede the flow in said fluid flow device and also movable into an open position to allow free flow of fluid in said fluid flow device, fuel control means associated with said driving engine for controlling the supply of fuel thereto throughout all of said working ranges, said fuel control means being manually movable selectively from an idling position to a plurality of increased fuel supply positions and vice versa, and connecting means operatively connecting said fuel control means with said fluid flow control means and including means for causing said fluid flow control means to move into closing position in response to movement of said fuel control means into its idling position and for causing said fluid flow control means to move into open position in response to movement of said fuel control means into one of its increased fuel supply positions.

2. A drive system according to claim 1, in which said fuel control means is manually operable.

3. In a drive system, especially for motor vehicles, equipped with an internal combustion engine: a speed variable fuel operable driving engine comprising an intake manifold, a transmission drivingly connected to said driving engine and comprising a fluid flow device having at least one working range and operating in said range with a continuously filled fluid circuit, fluid flow control means comprising adjustable means adjustably arranged within the fluid circuit of said fluid flow device and movable into a closing position to impede the flow in said fluid flow device and also movable into an open position to allow free flow of fluid in said fluid flow device, adjusting means arranged in said intake manifold and adapted to control the fuel supply to said engine throughout all of said working ranges, said adjusting means being manually movable selectively from an idling position to a plurality of increased fuel supply positions and vice versa, connecting means operatively connecting said adjusting means with said fluid flow control means and operable in response to movement of said adjusting means into said position corresponding to the idling of said engine to move said fluid flow control means into said closed position, and said connecting means also being operable for moving with said fluid flow control means into open position in response to movement of said adjustment means into a position corresponding to a condition of operation of said engine with increased fuel supply.

4. In a drive system, especially for motor vehicles equipped with an internal combustion engine: a speed variable fuel operable driving engine having adjustable fuel control means for controlling the fuel supply to said engine, a transmission drivingly connected to said driving engine and comprising a fluid flow device having at least one working range and operating in said working range with a continuously filled fluid circuit, fluid flow control means comprising fluid operable adjustable means adjustably arranged within the fluid circuit of said fluid flow device and movable into a closing position to impede the flow in said fluid flow device and also movable into an open position to allow free flow of fluid in said fluid flow device, means operatively connecting said fuel control means with said fluid flow control means and including fluid operable valve means for controlling the supply of fluid to and from said fluid operable adjustable means, said valve means being operable in response to adjustment of said fuel control means into position corresponding to a supply of fuel to said engine corresponding to the idling operation of the latter to convey actuating fluid to said adjustable means for moving the same to its closed position, said valve means also being operable in response to adjustment of said fuel control means into position corresponding to a fuel supply to said engine for operation thereof at a condition other than idling condition to discharge fluid from said fluid operable adjustable means to thereby allow the latter to move to its open position in response to the fluid pressure in said fluid flow device.

5. An arrangement according to claim 1, in which said adjustable means is continuously exposed to the fluid pressure in said fluid flow device whereby the fluid pressure in said fluid flow device continuously urges said adjustable means to move into its open position.

6. In a drive system, especially for motor vehicles equipped with an internal combustion engine: a speed variable fuel operable driving engine, fuel control means associated with said engine for controlling the supply of fuel thereto, a transmission drivingly connected to said driving engine and comprising a fluid flow device having at least one working range and having a working chamber, said fluid flow device operating in said working range with continuously filled fluid circuit, annular slide means associated with said fluid circuit and operable to move in axial direction into the working chamber of said fluid flow device to thereby impede the fluid flow in said working chamber, and means operatively connected to said annular slide means and operable to move said slide means into said working chamber in response to the positioning of said fuel control means in position for the engine to idle, said means also being operable to withdraw said slide means from said working chamber in response to the positioning of said fuel control means in any position corresponding to increased fuel supply.

7. An arrangement according to claim 6, in which said annular slide means is designed as annular piston.

8. An arrangement according to claim 6, in which said means includes fluid pressure supply means, and in which said annular slide means is designed as an annular piston having one side thereof exposed to the fluid in said working chamber and having its other side adapted for being exposed to fluid from said fluid pressure supply means.

9. In a drive system, especially for motor vehicles equipped with an internal combustion engine: a speed variable fuel operable driving engine having associated therewith fuel control means for controlling the supply of fuel thereto, a transmission drivingly connected to said driving engine and comprising a fluid flow device having at least one working range and operating in said working range with a continuously filled fluid circuit, fluid flow control means comprising adjustable means adjustably arranged within the fluid circuit of said fluid flow device and movable into a closing position to impede the flow in said fluid flow device and also movable into an open position to allow free flow of fluid in said fluid flow device, said fuel control means of said driving engine being operable to control the fuel supply to said engine throughout all of said working ranges and being movable manually selectively from an idling position to a plurality of increased fuel supply positions and vice versa, cam means operatively connected to said fuel control means and adjustable thereby, and means operatively connecting said cam means with said adjustable means for moving the latter into its closing position in response to the positioning of said fuel control means in said position corresponding to the idling operation of said engine and said cam means also operable to bring about movement of said adjustable means to its open position in response to the positioning of said fuel control means in any position corresponding to a condition of said engine with increased fuel supply.

10. In a drive system, especially for motor vehicles equipped with an internal combustion engine: a speed variable fuel operable driving engine, a transmission comprising a plurality of velocity ranges and drivingly connected to said driving engine and comprising a fluid flow device having at least one working range and operating in said working range with a continuously filled fluid circuit, fluid flow control means comprising adjustable means adjustably arranged within the fluid circuit of said fluid flow device and movable into a closing position to impede the flow in said fluid flow device and also movable into an open position to allow free flow of fluid in said fluid flow device, fuel control means associated with said driving engine for controlling the supply of fuel thereto, said fuel control means being movable selectively from an idling position to a plurality of increased fuel supply positions and vice versa, automatic shifting means operatively connected to said transmission for automatically shifting said velocity ranges, first cam means operatively connected to said automatic shifting means and responsive to the position of said fuel control means of said engine, second cam means operatively connected to said adjustable means for controlling the latter, shaft means having both said first and said second cam means mounted thereon and drivingly interconnecting said cam means, and connecting means operatively connecting said shaft means with said fuel control means for causing said second cam means to bring about movement of said adjustable means into closing position in response to said fuel control means occupying its idling position and also for bringing about movement of said adjustable means to its opening position in response to said fuel control means occupying any one of its increased fuel supply positions.

11. An arrangement according to claim 1, in which said transmission includes shiftable transmission ratio changing means succeeding said fluid flow device.

References Cited in the file of this patent

UNITED STATES PATENTS

| | | |
|---|---|---|
| Re. 21,385 | Cotterman | Mar. 12, 1940 |
| 2,341,921 | Jandasek | Feb. 15, 1944 |
| 2,354,596 | Jandasek | July 25, 1944 |
| 2,902,938 | Ebert | Sept. 8, 1959 |
| 2,950,630 | Zeidler | Aug. 30, 1960 |